United States Patent [19]

Wellington et al.

[11] 4,146,299

[45] Mar. 27, 1979

[54] OPTICAL WAVEGUIDE CONNECTORS FOR MULTIPLE WAVEGUIDE CABLES

[75] Inventors: Charles K. Wellington, Westford; Mark L. Dakss, Sudbury, both of Mass.

[73] Assignee: GTE Laboratories Incorporated, Waltham, Mass.

[21] Appl. No.: 731,058

[22] Filed: Oct. 8, 1976

[51] Int. Cl.² ............................................. G01B 5/14
[52] U.S. Cl. .................................................. 350/96.21
[58] Field of Search ........................... 350/96 C, 96 B

[56] References Cited

U.S. PATENT DOCUMENTS

| | | | |
|---|---|---|---|
| 3,864,018 | 2/1975 | Miller | 350/96 C |
| 3,885,859 | 5/1975 | Dalgleish | 350/96 C |
| 3,914,880 | 10/1975 | Dakss et al. | 350/96 C |
| 3,946,467 | 3/1976 | Lukas | 350/96 C |
| 4,030,809 | 6/1977 | Onishi | 350/96 C |
| 4,045,121 | 8/1977 | Clark | 350/96 C |

FOREIGN PATENT DOCUMENTS 2,363,986  7/1975  Fed. Rep. of Germany ........ 350/96 C Primary Examiner—John K. Corbin
Assistant Examiner—Rolf Hille
Attorney, Agent, or Firm—David M. Keay

[57] ABSTRACT

A multiple waveguide cable connector assembly is disclosed for coupling the opposing pluralities of protectively-jacketed optical fiber waveguides contained within a pair of multifiber cables.

Each of the two connectors forming the connector assembly contains a plurality of axially extending fiber-guiding channels sized to freely accommodate respective fibers, and a like plurality of transversely displaceable finger-like elements extending inwardly from the outer connector periphery into respective channels. The finger-like elements securely engage the protectively jacketed fibers against the channel walls when transversely displaced.

One of the connectors projectingly holds the bared fiber tips from one cable in a predetermined pattern at its mating end. The other connector internally holds the bared fiber tips of the second cable in an abutment region, and freely accommodates the projecting fiber tips from the first connector upon mating therewith.

The second connector additionally includes a plurality of transversely displaceable finger-like elements extending from the outer connector project into resective channels within the abutment region to securely align the abutting fiber tips within the channels when transversely displaced.

Means for displacing the jacket-engaging and fiber-engaging finger-like elements are provided in the form of sleeve members concentrically mounted about the connectors. The inner walls of the sleeve members engage outwardly extending portions of the finger-like elements to transversely displace them into a substantially flush relationship with the outer connector peripheries.

25 Claims, 5 Drawing Figures

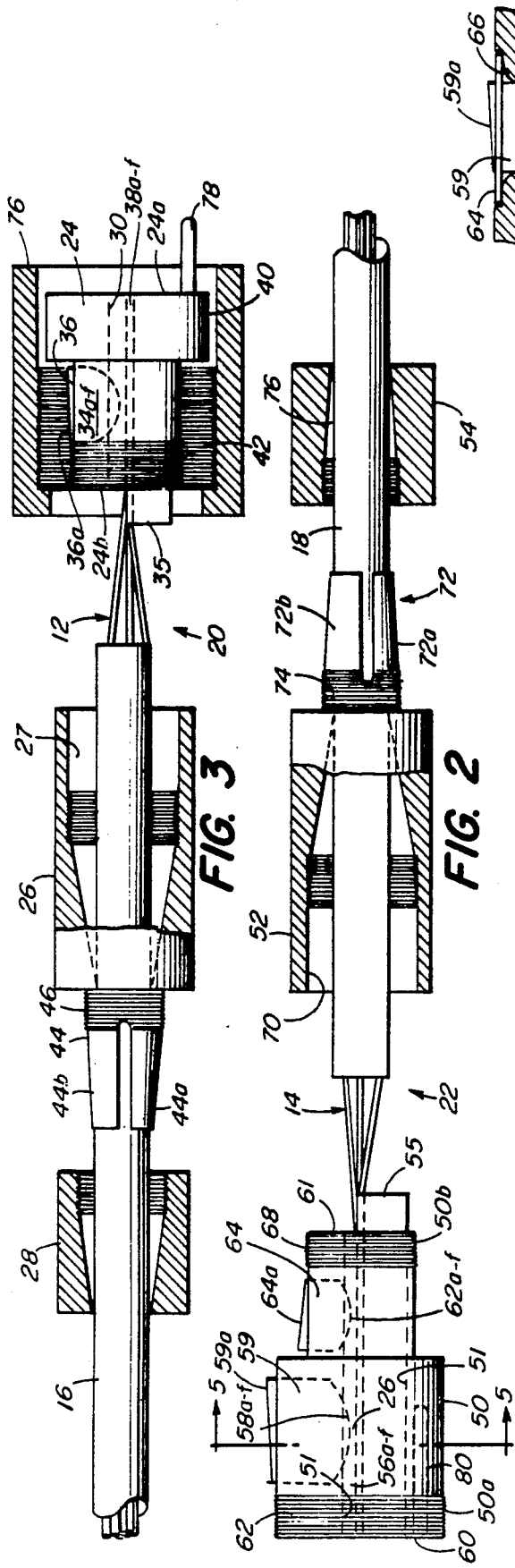
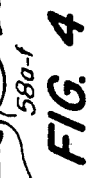
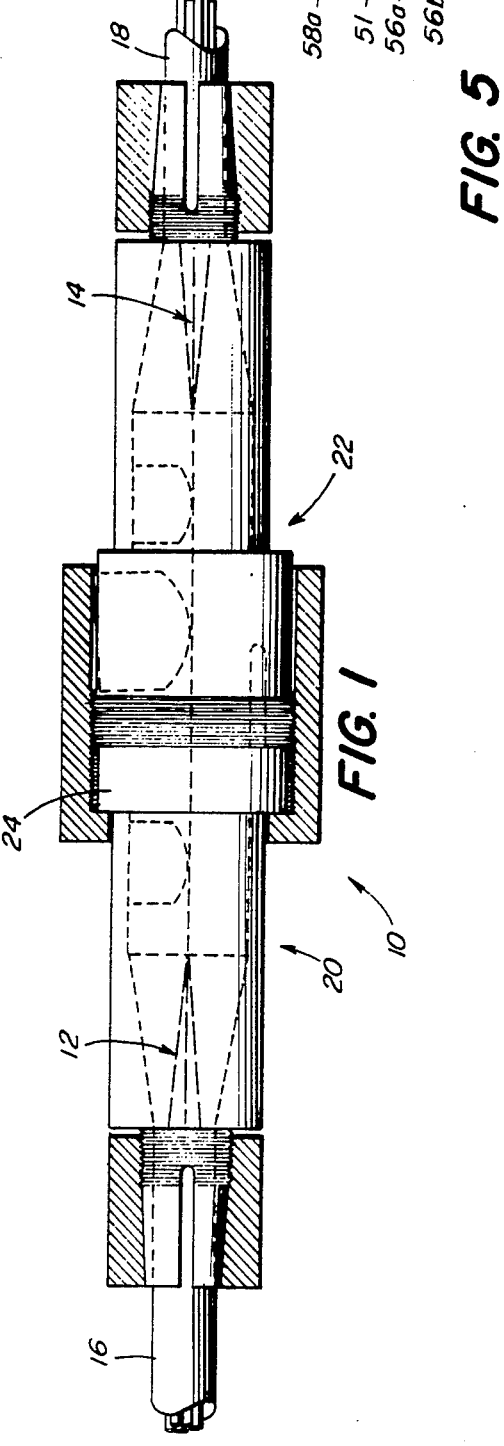
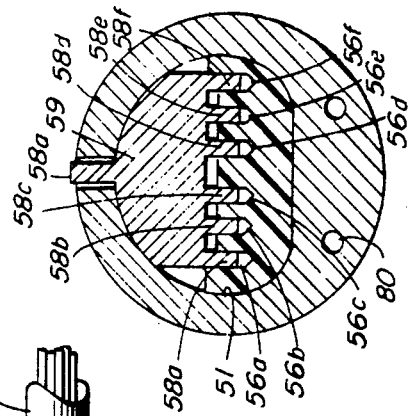

OPTICAL WAVEGUIDE CONNECTORS FOR MULTIPLE WAVEGUIDE CABLES

FIELD OF THE INVENTION

This invention relates generally to optical fiber waveguides and, more specifically, to connectors for coupling a pair of multi-fiber cables.

Optical fiber waveguides have potential use in communication systems for guiding light beams carrying voice, television and high speed data signals. One important area of technology that is required if optical fiber communication systems are to be implemented, is the development of useful techniques for fiber coupling. Efficient coupling of a pair of optical fibers demands minimal lateral and longitudinal separation of the fiber tips, and angular alignment thereof. The tolerance for longitudinal separation is generally the least critical of the three owing to the small degree of divergence of the light travelling between the tips, and to the divergence-reducing effect of an index-matching fluid which may be deposited between the fiber tips.

Angular misalignment may be minimized by properly locating the fibers within channels. Lateral separation, that is to say the non-coincidence of the optical axes of the coupled fibers, is the most critical parameter and must therefore be held within very exacting tolerances when a pair of optical fibers are to be coupled. For example, a coupling loss of 0.1 db requires a separation of no more than about 10% of the fiber core radius, or approximately 0.0001 inch for a typical fiber.

As a practical matter, optical communication systems often require the use of multi-fiber cables comprising a plurality of protectively jacketed optical fiber waveguides enclosed by a cable sheath. Many cable connections within each optical communications system, such as those to terminal equipment and routing interconnections will additionally require connectors having disconnect/reconnect capabilities.

SUMMARY OF THE PRIOR ART

In U.S. Pat. No. 3,861,781, there is shown a separable optical fiber connector comprising a terminal member having an axial through-hole which includes a first portion having a relatively large diameter equal to the diameter of the thermoplastic coated protectively jacketed optical fiber, and a narrow-diameter second portion having a diameter equal to that of the optical fiber without the coating. The fiber is inserted into the through-hole until it protrudes at the other end, whereupon it is affixed to the end surface of the terminal member and polished until it is flat therewith.

In U.S. Pat. No. 3,902,785, there is disclosed a dielectric optical waveguide coupler comprising a pair of identical plugs engaged in a double socket. Each plug consists of a sleeve and capillary bore glass tube within the sleeve arranged so that an annular space exists between an interior wall of the sleeve and an exterior wall of the tube. A dielectric optical waveguide is threaded through the capillary bore and rigidly fixed therein. A slide, consisting of a tube, can slide within the annular space. A second length of capillary bore tube is fixed within the slide and the dielectric optical waveguide is partially inserted within, and is free to slide with respect to, the bore of this tube. The socket consists of a third length of capillary bore tubes surrounded by a collar. On inserting the plugs into the socket, the slide moves backwards causing two lengths of dielectric optical waveguide, one from each plug, to enter the bore of the third length of capillary bore tube. When the two lengths of dielectric optical waveguide abut, an optical coupling is formed and the plugs can be locked in position.

In U.S. Pat. No. 3,948,582, there is shown an optical fiber connector comprising separately formed bodies of substantially elongate form, each having an axial bore in which an optical fiber can be fitted. The end of one body defines a flared socket adapted to mate with the conical plug shaped end of the second body. An optical fiber waveguide is protrudingly held by the plug shaped body and is pushed into the bore of the flared socketed body as the plug mates with the socket.

In an article entitled "Optical Fiber Connector" by J. F. Dalgleish, et al. (*Electronics Letters* Vol. 11. No. 1 (Jan. 9, 1975)), bared fiber ends are located radially at the bottom of a axially extending V-groove formed in one of a pair of interlocking housings. The second housing fits over the first and provides two fiber-accommodating slots transverse to the length of the V-groove, and a pair of fiber-retaining wires which push the fiber ends to the bottom of the groove.

It may be appreciated in the foregoing U.S. patents that it is necessary to push the optical fiber waveguide into the tight capillary bore required to obtain accurate alignment of the fibers. This is a rather precarious procedure owing to the fragility of the optical fiber waveguides; that is a tendency for the fibers to break when pushed through a tight capillary. Additionally, for the devices of U.S. Pat. Nos. 3,902,285 and 3,948,582, the stresses to which the spliced fibers are subjected are transmitted along the individual fibers and the resistances of these splices to the stresses are thereby limited by the relatively weak strength of the optical fibers. None of these techniques utilize the practical aspect of telecommunication systems whereby optical fiber waveguides will be grouped in multiple fiber cables. Accordingly, none of these references treat the consideration that the cable sheath may be safely anchored as part of the connection to distribute the stresses induced by the coupler.

A few connectors having disconnect/reconnect capability and adapted for use with multi-fiber cables are known in the art. One type requires the fibers to be fabricated into ribbons in which the fibers must be coplanar, very accurately spaced, and have outer diameters and core centerings which match to approximately 1%. Examples of these connectors may be found in *Bell System Tech. Journal;* Vol. 54, pp. 471–479, (1971). In U.S. Pat. No. 3,864,018, a connector is disclosed which requires the stacking of rows of fibers alternately with grooved plates.

It should be noted that the fiber-accommodating channels of the above described devices are rigid and consequently do not allow for the variations in fiber diameters which occur in manufacturing. These variations cause lateral misalignment of opposing fiber tips with the sustantial resulting coupling losses indicated above.

In a connector assembly described in *Electronics* Vol. 48, p. 29 (Aug. 21, 1975) the wall of each fiber is held in an opening formed by the sides of three compressible plastic cylindrical alignment structures. One of the cylinders extends axially along the interior of one connector and rests on two adjacent cylinders extending axially along the interior of a laterally mating connector, the groove between the two adjacent cylinders being thereby enclosed by the surface of said one cylinder to define the opening. Although this assembly allows for fiber diameter variations because of its flexible grooves, it has several disadvantages. The fibers of one cable associated with the two-cylinder connector, must be individually inserted into the appropriate grooves with the accompanying substantial risk of fiber breakage. The fibers of the second cable, associated with the one-cylinder connector, do not sit in grooves, but remain on the top surface of the appropriate cylinder and fall into the grooves of the two-cylinder connector when the connectors are mated.

In our co-pending U.S. Patent application Ser. No. 689,753, filed May 25, 1976 now U.S. Pat. No. 4,097,129 and assigned to the assignee of the present application, there is disclosed a device for coupling a pair of optical fibers comprising a resiliently compressible body for holding a plurality of opposing protectively jacketed fiber pairs in end-to-end abuttment within an oversized bore. The body is symmetrically compressed about its central portion to reduce the bore cross-section to a fiber engaging dimension around the bare fiber tips. Similarly, the body is compressed about its end portions to decrease the bore cross-section to a jacket-clamping dimension wherein stresses in the spliced region are distributed along the fiber jacket.

SUMMARY OF THE INVENTION

The connectors used for coupling multi-fiber cables to each other or to system equipment should have certain general characteristics. Cable and fiber-end preparation should be simple and fibers should be easily inserted into the connector with a minimal danger of breakage. Fibers having diameter variations within reasonable manufacturing tolerances should be accommodated with minimal coupling loss. The connector should be rugged and installed on the cable in a manner which minimizes the possibility of fiber damage during handling or coupling of the connectors. The light throughput efficiency of the coupled connectors should be high, preferably greater than 95%. Finally, the connectors should be easily mated.

Accordingly, a multi-fiber cable connector assembly is disclosed for coupling the opposing pluralities of protectively jacketed optical fiber waveguides contained within a pair of multi-fiber cables. The connector assembly comprises an opposing pair of mating connectors, each containing a plurality of axially extending fiber-guiding channels sized to freely accommodate respectively inserted fibers. The connectors each further contain a like plurality of internal and transversely displaceable jacket-engaging surface members which project inwardly into the respective channels. One of the connectors is adapted to accommodate the jacketed fibers from one of the cable pair and to projectingly hold the bared fiber tips in a predetermined pattern at its mating end. The second connector is adapted to accommodate the jacketed fibers from the other cable and to internally hold the bared fiber tips thereof in a similar pattern. The second connector is further adapted to freely accommodate the projecting fiber tips from the first housing upon mating therewith to hold the opposing pairs of fiber tips in abuttment. The second connector additionally includes a plurality of internal and transversely displaceable fiber-engaging surface members arranged to project into respective channels within the abuttment area to securely align the abutting fiber tips. The cable connector assembly further comprises first means for transversely displacing the jacket-engaging surfaces of each housing to secure the accommodated fibers within their respective channels and second means for transversely displacing the fiber-engaging surfaces of the second housing to securely align the abutting fiber tips.

Either of the connectors may additionally be utilized to couple a multi-fiber cable to system terminal connectors. Additionally, a connector assembly for coupling a pair of single fiber waveguides and including a pair of connectors having a single fiber-accommodating channel is also within the purview of the invention. These and other features of a multi-fiber cable connector assembly constructed in accordance with the invention disclosed herein will be more fully described in the following description which is to be read in conjunction with the accompanying drawings.

BRIEF DESCRIPTION OF THE DRAWING

In the Drawing:

FIG. 1 is a partially sectioned view of an assembled multiple optical fiber cable connector assembly constructed in accordance with the invention.

FIG. 2 is a partially sectioned view, showing a disassembled one of mating connectors forming the connector assembly of FIG. 1.

FIG. 3 is a partially sectioned view showing the disassembled second mating connector forming the connector assembly of FIG. 1.

FIG. 4 is an enlarged fragmentary view showing features of the jacket-engaging finger-like elements in FIGS. 1–3.

FIG. 5 is a cross-sectional view of the first mating connector taken along line 5—5 of FIG. 2.

It should be noted that like reference numerals will be used throughout the Figures to designate identical elements of the multiple optical fiber cable connector assembly.

DESCRIPTION OF THE PREFERRED EMBODIMENT

With initial reference to FIG. 1, there is shown a multi-fiber cable connector assembly 10, constructed in accordance with the invention, for coupling the opposing pluralities of protectively jacketed optical fiber waveguides 12 and 14 contained within a pair of multi-fiber cables 16 and 18. The connector assembly 10 comprises an opposing pair of mating connectors 20 and 22 which, for the sake of clarity, will be individually described below.

FIG. 2 is a partially sectioned view of one of the mating connectors forming the connector assembly of FIG. 1 and shown in disassembly so that its various components and their interrelationships may be more readily appreciated.

The first connector 22, hereinafter referred to as the female connector, comprises a rigid housing 50, formed from a metal or a plastic such as acetal or polycarbonate, and having a generally cylindrical shape and an axially extending throughbore 51 between and in communication with, its mating face 60 and its fiber-receiving face 61. As will be more fully described below, a plurality of axially extending, generally V-shaped, fiber-accommodating channels, illustratively shown as 56a-f, are disposed within the bore and serve to individually guide the optical fiber waveguides 14 through the housing 50 and internally hold the bared waveguide 14 tips in a predetermined pattern in an abuttment region 26.

As will also be explained in greater detail below, the waveguides 14 are secured within their respective channels by a plurality of transversely displaceable jacket-engaging surfaces formed by finger-like members 62a–f which extend inwardly into respective channels from a common base 64 located interjacent the end portions 50a, 50b of the housing 50. At least a portion of the common base 64 forms a generally wedge-shaped cam surface 64a extending slightly outward from the housing 50 periphery.

In the preferred embodiment, the finger-like elements 62a–f are outwardly spaced from the channel surface so that the waveguides may be freely inserted and withdrawn, and are inwardly displaceable so as to contact the protective jacketing of the waveguides 14 and securely press the waveguides into their respective channels subsequent to insertion. The pressure exerted by the fingers on the jacketing is sufficient to secure the fibers against movement but incapable of damaging them owing to the protective nature of the fiber jacketing which precludes the waveguides from being scratches or nicked and additionally distributes the forces exerted thereon.

A like plurality of finger-like elements 58a–f, similar to the elements 62a–f are provided within the abutment region 26. The finger elements 58a–f are also outwardly biased from the channel surfaces to freely accommodate the insertion or withdrawal of the fiber tips. Unlike the jacket-engaging surfaces of finger elements 62a–f, however, the surfaces of the finger-like elements 58a–f are adapted to engage the bared fibers when inwardly displaced and serve, in a manner more fully described hereinbelow, to align the plurality of abuttingly held fiber tips in the region 26 when the connectors 20 and 22 are mated. Accordingly, the fiber-engaging surfaces of the finger-like elements 58a–f are formed from a resilient material such as polypropylene or polyethylene, which deforms slightly when in pressing contact with the bare waveguide tips. In the preferred embodiment, many features of finger elements 62a–f and 58a–f are identical and the features described immediately below with reference to FIGS. 4 to 5 are common to both unless otherwise indicated.

FIG. 4 is a fragmentary view of the finger-like elements 58a–f of FIG. 2. The finger-elements 58a–f are shown extending from a common base 59, the outer peripheral portion of which includes a generally wedge-shaped cam surface 59a and a generally linear supporting leaf spring 64. In the preferred embodiment, leaf spring 64 is integral with the base 59 and comprises a resilient material such as polypropylene or polyethylene. The leaf spring 64 rests upon a contoured shoulder 66 surrounding a slot 88 that extends inwardly from the housing 50 periphery to the housing through-bore 51.

The leaf spring 64 may thereby be deformed against the shoulder 66 by the application of an inwardly directed force against the cam surface 59a to permit the inward displacement of the finger-like elements 58a–f into the channels 56a–f. The channels 56a–f and finger-like elements 58a–f are depicted with greater clarity in FIG. 5.

FIG. 5 is a cross-sectional view of the housing 50 of FIG. 2 taken along line 5—5 therein. The through-bore 51 of the housing 50 contains a plurality of generally V-shaped fiber-accommodating channels 56a–f and a like plurality of finger-like elements 58a–f, each extending into a respective channel from a common base 59. The channels are depicted as comprising a linear array, although as will be apparent, any of a variety of patterns may be chosen. The clearance between each finger 58a–f and the base of the respective channels 56a–f prior to any inward displacement of the fingers is such that an optical fiber waveguide may be freely inserted, within each channel, through the housing 50 to be internally held within the abutment region 26. The subsequent inward displacement of the fingers 64a–f (FIG. 2) thereby secures the individual waveguides within their respective channels by engaging the protectively jacketed portion thereof, while the fingers 58a–f engage the bared fiber tips for optical alignment with the abutting fibers of a mating connector in a manner hereinafter described.

In the preferred embodiment, both the finger-like elements 58a–f and the channels 56a–f are formed from a resilient material such as polypropylene or polyethylene which deforms slightly when in pressing contact with the waveguides. Consequently, the waveguide tips may be firmly secured without the exertion thereon of potentially damaging forces. The deformation of the resilient V-shaped channel material additionally allows self-centering of waveguides having differing diameters within manufacturing tolerances.

To fully support each fiber and preclude unnecessary bending, the inner dimensions of the channels 56a–f are provided with a stepped dimensional change adjacent to the abutment region to compensate for the relatively smaller diameter of the bared fiber tip compared to that of the jacketed length of the fiber. The step additionally provides the means for accurately locating the tips within the abutment region by engaging the leading edge of the fiber jacket to control the depth of insertion into the housing 50.

To conveniently manufacture rigid connectors with resilient channels, the channels may be formed as an insert of resilient material which, as depicted in FIG. 5, may be inserted into the housing bore 51.

Returning to FIG. 2, it may be additionally appreciated that the channels 56a–f may extend axially beyond the fiber-receiving end 50b of the housing 50 to define a shelf 55 that facilitates the placement of the waveguides 14 within the channels 56a–f.

Turning now to the means by which the finger-like elements 62a–f are transversely displaced, it may be seen from FIGS. 1 and 2 that the inwardly directed force exerted upon the cam surface 64a to secure the jacketed fibers in the channels is dervied from a first partially internally threaded sleeve-like member 52 which is tightened onto the fiber-receiving end 50b of the housing 50 by engaging the external threads 68 formed thereon for that purpose. As the sleeve member 52 is tightened onto the housing 50, the unthreaded forward portion 70 of its inner periphery contacts the cam surface 64a and pushes it inwardly into a substantially flush relationship with the housing 50 periphery. To prevent the internally threaded region of the sleeve 52 from abrasively contacting the cam surface 64a, the tightening of the sleeve member 52 onto the housing 50 may be limited by sizing the housing end portion 50a, located adjacent to the mating face 24a, with a larger outer diameter than the internal diameter of the sleeve member 52.

In addition to inwardly displacing the fingers 62a–f, the sleeve member 52 securely supports the multi-fiber cable 18 by means of a cable-securing jaw 72 at its cable-receiving end. The jaw 72 comprises a plurality of cantilevered elements, depicted as 72a, 72b extending from a common externally threaded shaft 74. The cantilevered elements are spaced apart to freely admit the multi-fiber cable 18 and function in a manner similar to a drill chuck to secure the cable 18. Accordingly, a second internally threaded sleeve member 54 is sized to tighten onto the externally threaded shaft 74. The second sleeve member 54 has a conically tapered bore 76 adapted to radially compress the cantilevered elements 72a, 72b, as the sleeve member 54 is tightened onto the shaft 74, to securely and firmly engage the multi-fiber cable 18.

Attention will next be turned to FIG. 3 which is a partially sectioned view of the other mating connector 20 in disassembly. Many of the features of the connector 20, hereinafter referred to as the male connector, are similar to those described with reference to the female connector 22; for the sake of brevity, only differences in the male connector 20 will be discussed. The male connector 20 is shown to comprise a male housing 24, and a pair of sleeve-like members 26, 28, respectively similar in appearance and function to the sleeve-like members 52, 54 discussed above. The male housing 24 has an axially extending through-bore 30 containing a plurality of generally V-shaped channels 38a-f arranged in a pattern substantially identical to those of the female housing 50.

The male housing 24 is, however, adapted to projectingly hold the bare tips of the fiber waveguides 12 in respective channels. The clearance between the female connector channels 56a-f and fingers 58a-f is such that the projectingly-held bare fiber tips from the male connector 20 are freely admitted into, and accommodated within, the female housing 50 when the housings 24, 50 are mated.

Each of the abutting pairs of fiber tips are securely aligned within their respective channel and in the aforementioned manner by the transverse displacement of the fingers 58a-f. The transverse displacement is induced by the engagement of the cam surface 59a with the interior periphery of a connector interface sleeve 76 mounted concentrically about the male connector housing 24. The sleeve 76 is partially internally threaded to mate with external threads 62, respectively provided for that purpose on the mating end of the female housing 50. The forward portion of the interior sleeve 76 periphery is preferably unthreaded to minimize the wear upon the cam surface 59a. As may be seen with reference to FIG. 1, the connector interface sleeve 76 insures a secure and rigid connection while precluding the inadvertent decoupling of the male and female connectors.

Having thus described the structural features of the multi-fiber cable connector assembly, attention is directed to the manner in which the connector assembly is utilized to couple a pair of such cables. As is known in the art, multifiber cables contain a plurality of protectively jacketed optical fiber waveguides. The protective jacketing serves to protect the fragile waveguides from inadvertently caused scratches and nicks, and additionally serves to distribute potentially damaging stresses. In the coupling process, this protective jacketing must first be removed from the fiber tips.

Accordingly, a portion of the outer cable sheath is removed and drawn back and the fibers splayed out to form an essentially linear array, on a simple support plate. The individual fibers' protective jacketing can then be removed by any means known in the art as, for example, by a hot wire stripper. The fibers can then be scored and broken simultaneously. Although the fibers may be splayed subsequent to scoring and breaking, prior splaying yields fibers with ends having the same length and minimizes the handling of bare fibers and, consequently, the possibility of fiber breakage.

The male connector 20 may then be assembled by slipping the sleeve member 28 and the sleeve member 26 onto the cable 16 and inserting the waveguides 12 of the cable 16 into the V-grooved channels of the housing 24 until the bared fiber tips protrude beyond the face 24a by a predetermined amount. Since the fibers in the V-grooves of the housing are protectively jacketed while the protruding fiber tips are bare, the depth of insertion of the waveguides may be controlled by internal stops in the housing 24 which contact the ends of the fiber jacketing. It may be appreciated that the V-grooved extension shelf 55 facilitates the placement of each waveguide into an appropriate channel. Each V-groove in the housing 24 is deep enough to preclude, in combination with undisplaced finger elements, the jumping of channels by the fibers.

The sleeve member 26 is then slid along the cable toward the housing 24 and tightened thereon while the cable is held in a manner which prevents its rotation. As the sleeve 26 is tightened onto the housing 24, the cam surface 36a is depressed so that the finger-like members 34a-f clamp the protectively jacketed fibers at the bottom of the channels 38a-f. The sleeve member 28 is subsequently tightened onto the opposite remaining end of the sleeve member 26 to solidly clamp the cable 16 by means of the jaws 44. In this manner, support and strain relief for the fibers are provided; in other words, the fibers are isolated from tensions applied on the cable beyond the connector.

The female connector 22 is similarly assembled. However, the tips of the fiber waveguides 14 inserted into the female housing 50 are recessed from the mating face 60 by a predetermined distance corresponding to the distance by which the waveguides 12 of the housing 24 project. The male and female connectors 20, 22 are subsequently mated. Means for accurately aligning the projectingly-held fiber tips with the channels of the female connector are provided by a pair of guide pins 78 in the male connector which mate with guide holes 80 in the female connector. Potentially damaging handling of the waveguides associated with conventional couplers during mating is thereby advantageously eliminated. Although the bare fibers slide freely into the V-grooves of the female housing 50, the clearance between the fingers 58a-f and the channels is such that the opposing fiber tips will butt against each other rather than pass each other by. Any take-up of extra fiber will occur in accumulation chambers provided on either side of the fingers 58a-f. The connector interface sleeve 76 is then tightened onto the female housing 50 to make a firm connection. A covered access hole through the connector housing may be provided for the application of index matching fluid, or the fluid can be preloaded into the V-grooves of the housing 24, 50.

As explained above, the connector interface sleeve 76 causes the fingers 58a-f to align and clamp the opposing fiber tips down into the V-groove channels. Because the fingers and channels comprise a soft resilient material to compensate for variations of the fiber diameters within manufacturing tolerances, a high coupling efficiency is provided. Additionally, the connector halves may be disconnected and reconnected or disassembled and reassembled as needed.

It may be appreciated that either of the connectors 20, 22 described above may be utilized in conjunction with the terminal connector associated with the hardware comprising a particular system. As a practical matter, the terminal connector would be similar to the female housing 50 described herein and internally hold a plurality of fiber waveguides protected by the housing structure. A multi-fiber cable terminating in a male connector, such as hereindescribed connector 20, could be coupled to the system in the manner described above.

Additionally, a connector and connector assembly of the type described herein, but having a single channel may be used for coupling single fiber waveguides.

While the preferred embodiment of a multi-fiber cable coupler has been described above, it is apparent that numerous variations and modifications are obvious to one skilled in the art. These variations and modifications are included within the scope of the present invention which are defined and limited only by the appended claims.

We claim:

1. A multi-fiber cable connector assembly for coupling the opposing plurality of protectively jacketed optical fiber waveguides contained within a pair of multi-fiber cables and comprising:

an opposing pair of mating connectors, each containing a plurality of axially extending fiber-guiding channels sized to freely accommodate respectively inserted fibers, the connectors each including a like plurality of internal and transversely displaceable jacket-engaging surface members arranged to transversely project into respective channels;

one of the connectors being adapted to accommodate the jacketed fibers from one of the cables of the pair and to projectingly hold the bared fiber tips in a predetermined pattern at its mating end;

the second connector being adapted to accommodate the jacketed fibers from the other cable and to internally hold the bared fiber tips thereof in a similar pattern, the second connector being further adapted to freely accept the projecting fiber tips from the first housing upon mating therewith to hold the opposing pairs of fiber tips in abutment, the second connector including a plurality of transversely displaceable fiberengaging surface members arranged to project into respective channels within the abutment area to securely align the abutting fiber tips;

first displacement means for transversely displacing the jacket-engaging surface members of each connector to secure the accommodated fibers within their respective channels; and second displacement means for transversely displacing the fiber-engaging surface members of the second connector to securely align the abutting fiber tips upon movement of the second displacement means along the direction of the axially extending channels.

2. The connector assembly of claim 1 wherein the connectors are generally cylindrical.

3. The connector assembly of claim 2 wherein each connector includes a housing having an axial through-bore, and the channels are formed in a resilient material inserted within the housing through-bore.

4. The connector assembly of claim 3 wherein the jacket-engaging surface members of each connector are formed by a plurality of projecting finger-like membrs, each extending inwardly from a common base located slightly outward from the housing periphery; and the first displacement means comprises an annular member mounted about each housing and sized to exert a transversely directed force on the common base to secure the jacketed fibers within their respective channels upon movement of the annular member along the direction of the axially extending channels.

5. The connector assembly of claim 1 wherein the channels comprise a plurality of axially extending grooves having generally V-shaped bottom surfaces; and the undisplaced fiber-engaging surface members extend inwardly into the respective channels and are spaced from the bottom surfaces to permit the unrestrained insertion and withdrawal of fibers from the channels while preventing the fibers from jumping channels.

6. The connector assembly of claim 4 wherein each annular member comprises a generally cylindrical sleeve having one end mounted about the non-mating end of the respective housing to exert a radially directed force on the common base upon movement of the sleeve along the direction of the axially extending channels, and its other end sized to receive the multi-fiber cable, each sleeve having a splaying region between its two ends for accommodating the diverging fibers exiting from the cable.

7. The connector assembly of claim 6 wherein the other end of each sleeve comprises a plurality of resilient inwardly deformable jaws for clamping about the cable; and further including means for inwardly deforming the jaws to securely clamp the cable.

8. The connector assembly of claim 3 wherein the bare fiber-engaging surface members are formed by a plurality of projecting finger-like members extending inwardly from a common base located slightly outward from the periphery of the housing of the second connector; and the second displacement means comprises an annular member mounted about the housing of the second connector and sized to exert a radially directed force on the common base upon movement of the annular member along the direction of the axially extending channels.

9. The connector assembly of claim 8 wherein the finger-like members are resilient.

10. The connector assembly of claim 8 wherein the annular member comprises a generally cylindrical sleeve encompassing the mating ends of the housings of the first and second connectors to securely support the ends in a mating relationship.

11. A multi-fiber cable connector for coupling the plurality of optical fiber waveguides of a multi-fiber cable to an array of optical fiber waveguides dispersed within a connecting means, the multi-fiber cable connector comprising:

a housing adapted to mate with the connecting means and containing a plurality of axially extending fiber-guiding through-channels sized to freely accommodate respectively inserted optical fiber waveguides and arranged to hold the waveguides in a pattern similar to that of the array, whereby the fibers of the mating housing and connecting means are in opposing abutment;

a plurality of transversely displaceable finger-like elements, each extending inwardly into a respective channel from the periphery of the housing and spaced from the channel bottom in its first position to permit the unrestrained insertion and withdrawal of a fiber waveguide from the channel and in its second position to secure the fiber therein;

means for securing the housing in mating relationship with the connecting means; and means for transversely displacing the finger-like elements upon movement of said means for securing the housing in mating relationship with the connecting means along the direction of the axially extending channels.

12. The connector of claim 11 wherein the housing includes an axial through-bore and the channels are formed in an insertable material inserted within the through-bore.

13. The connector of claim 12 wherein the material is resilient.

14. The connector of claim 13 wherein the resilient material is selected from the group consisting of polyethylene and polypropylene.

15. The connector of claim 11 wherein the channels have generally V-shaped bottom surfaces; and the finger-like elements each extend into the respective channels and are spaced from the bottom surfaces when in the first position to permit the unrestrained insertion and withdrawal of fiber waveguides from the channels while preventing the fiber waveguides from jumping channels.

16. The connector of claim 11 wherein the second position of the finger-like elements is its transversely displaced position.

17. A connector for use with protectively jacketed optical fiber waveguides comprising:

a housing having an axially extending through-bore containing a fiber accommodating channel oversized with respect to the waveguide cross-section so as to freely admit the waveguide, the housing further having a transversely extending slot in communication with its outer periphery at one end and the through-bore at the other end;

a transversely displaceable element passing through the slot and having a waveguide-engaging surface spaced from the channel in one position to permit free insertion and withdrawal of an optical fiber waveguide;

an annular member mounted about the housing for transversely displacing the displaceable element to secure the waveguide against the channel walls upon movement of the annular member along the direction of the axially extending through-bore.

18. The connector of claim 17 wherein the transversely displaceable element includes a peripheral portion extending transversely outward from the housing periphery for engagement with the annular member upon movement of the annular member along the direction of the axially extending through-bore, and an inwardly projecting portion for engaging the waveguide jacketing; and further including a leaf spring circumferentially supporting the displaceable element within the slot to resiliently permit the transverse displacement of the displaceable element.

19. The connector of claim 18 wherein the leaf spring is integrally formed on the transversely displaceable element as a circumferential supporting shoulder adapted to overlap the housing in the region adjacent to the slot.

20. The connector of claim 19 wherein the overlapped region of the housing is generally curved to accommodate the shoulder.

21. The connector of claim 18 wherein the periphery portion of the displaceable element includes a generally wedge-shaped cam surface extending slightly outward from the housing periphery and adapted for engagement with the annular member upon movement of the annular member along the direction of the axially extending through-bore.

22. An optical fiber waveguide connector assembly for coupling opposing optical fibers comprising a first connector containing a axially extending fiber-guiding through-channel for accommodating an optical fiber and including means for holding a fiber within the channel with the fiber tip projecting;

a second connector containing a axially extending fiber-guiding through-channel for accommodating an optical fiber and including means for holding a fiber within the channel, the second connector being adapted to freely accept the projecting fiber tip from the first connector with the opposing fiber tips in abutment upon mating of the first and second connectors, and the second connector including a transversely displacable fiber-engaging element extending inwardly into the channel within the abutment area, said displacable element being spaced from the bottom of the channel to permit unrestrained insertion and withdrawal of a fiber from the channel in the abutment area when in a first position and being adapted to secure and align the abutting fiber tips when in a second position; and coupling means for securing the first and second connectors together subsequent to mating and for transversely displacing the displacable element from the first position to the second position to securely align the abutting fiber tips, upon movement of the couplings means in the direction of the axially extending channels.

23. The connector assembly of claim 22 wherein each connector is generally cylindrical and includes a housing having an axial through-bore, and the channels are formed in a resilient material inserted within the housing through-bore.

24. The connector assembly of claim 23 wherein the displacable fiber-engaging element includes a finger-like member extending inwardly into the channel to permit unrestrained insertion and withdrawal of a fiber from the channel in the abutment area while preventing the fiber from jumping the channel when the displacable element is in said first position, said finger-like member extending from a peripheral portion projecting slightly outward from the periphery of the housing of the second connector when the displacable element is in said first position; and the coupling means transversely displaces the displacable element from said first position to said second position upon securing the first and second connectors together subsequent to mating whereby the finger-like member aligns and secures the abutting fiber tips in the channel.

25. The connector assembly of claim 24 wherein the peripheral portion of the displacable fiber-engaging element has a generally wedge-shaped cam surface projecting slightly outward from the periphery of the housing and adapted for engagement with the coupling means; and the coupling means comprises a generally cylindrical sleeve encompassing the mating ends of the first and second connectors when in mating relationship and adapted to be threaded on to one of the connectors to secure the connectors to each other, the sleeve having an internal camming surface adapted for engagement with the cam surface of the peripheral portion of of the displacable fiber-engaging element for transversely moving the displacable fiber-engaging element from said first position to said second position upon threading of the sleeve on to the one of the connectors.

* * * * *